United States Patent [19]

Blackwell

[11] 4,040,649

[45] Aug. 9, 1977

[54] OIL WELL TOOL WITH PACKING MEANS

[75] Inventor: Henry Wayne Blackwell, Venus, Tex.

[73] Assignee: Dresser Industries, Inc., Dallas, Tex.

[21] Appl. No.: 627,633

[22] Filed: Oct. 31, 1975

[51] Int. Cl.² .................... F16L 37/22; E21B 33/12
[52] U.S. Cl. ................................ 285/3; 285/18; 285/315
[58] Field of Search .............. 285/18, 3, 315, 316, 285/377, DIG. 21; 166/125

[56] References Cited

U.S. PATENT DOCUMENTS

| 2,565,572 | 8/1951 | Pangborn | 285/316 X |
|---|---|---|---|
| 2,962,096 | 11/1960 | Knox | 285/18 X |
| 3,163,222 | 12/1964 | Foster et al. | 285/18 X |
| 3,334,923 | 8/1967 | Putch | 285/3 X |
| 3,393,926 | 7/1968 | Arnold | 285/18 |
| 3,459,442 | 8/1969 | De Yarmett et al. | 285/315 X |
| 3,477,744 | 11/1969 | Brown | 285/3 |
| 3,488,031 | 1/1970 | Bezner et al. | 285/18 X |
| 3,497,862 | 2/1970 | Geffner | 285/18 X |
| 3,713,675 | 1/1973 | White | 285/3 |
| 3,847,413 | 11/1974 | Gurley et al. | 285/316 |

Primary Examiner—Thomas F. Callaghan
Attorney, Agent, or Firm—Michael J. Caddell

[57] ABSTRACT

An oil well tool containing a well packer and which is particularly suitable for use in well bores located in extremely cold climates utilizes an hydraulically actuated packer which is actuable when the well head is flanged up and releasable thermal expansion means for compensation against thermal expansion and contraction in the tool string.

5 Claims, 8 Drawing Figures

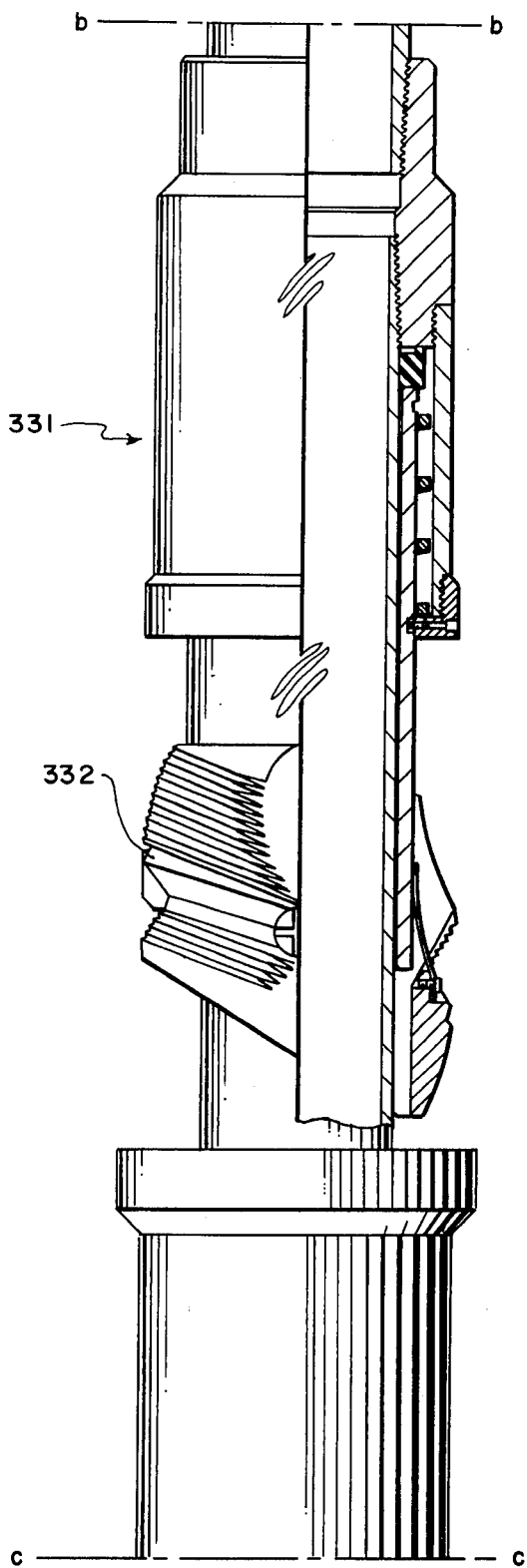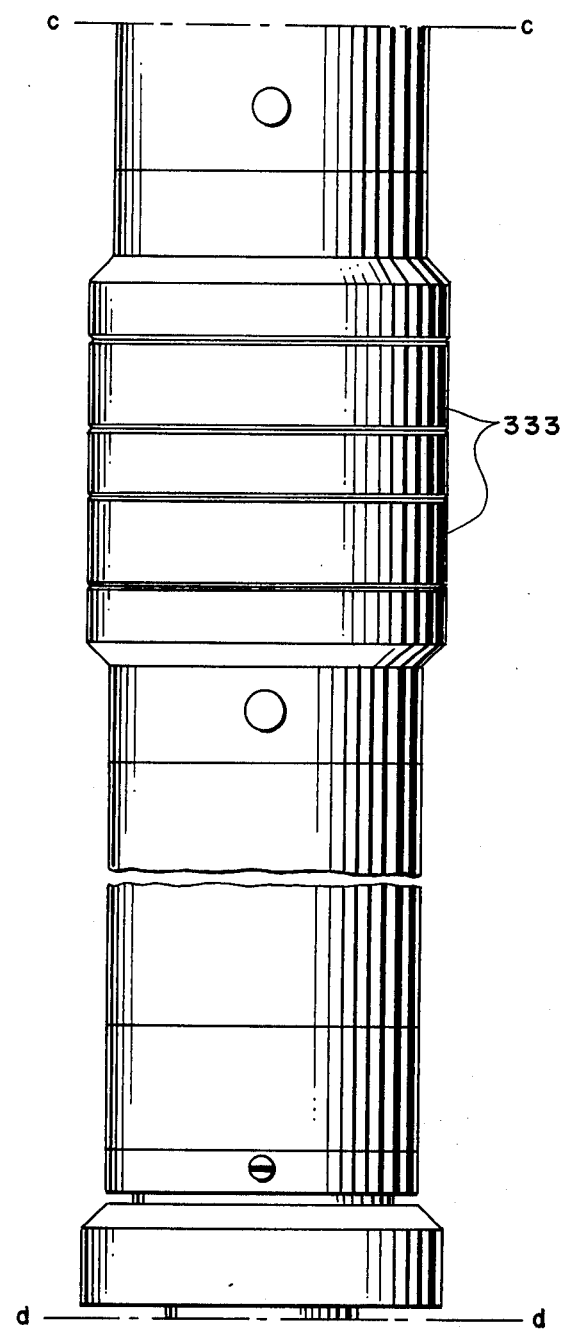
FIG. 1c
FIG. 1d

OIL WELL TOOL WITH PACKING MEANS

BACKGROUND OF THE INVENTION.

The present invention involves a well packer and associated tools and more specifically is directed towards an hydraulically actuated well packer actuatable after the well head has been flanged up, and featuring a releasable contraction means for compensation against thermal contraction and expansion of the tool string in response to the wide range of temperatures from the ground surface to the bottom of the well bore, and particularly advantageous in compensating for the large contraction of the string encountered when very cold fluids are pumped down the well from the surface.

When working in extremely cold regions, such as Alaska and the north slope, wide ranges of temperatures are often encountered between surface conditions and bottom hole location. For instance, a well may have a bottom hole temperature of 200° to 300° F, while at the surface the ambient temperature may apporach 80° below zero. As a consequence of this, the thermal contraction and expansion of a steel tubing string 10,000 to 20,000 feet in length going from the surface into the well bore accumulates into a considerable amount while the string is located downhole.

There are several extremely efficient and dependable packer mechanisms available for use under normal temperature conditions which suffer some disadvantages when used in cold climates. For example, the packers disclosed in U.S. Pat. Nos. 3,548,936 and 3,818,987, assigned to Dresser Industries, Inc. and commerically designated as Uni-Packer VII well packers and Uni-Packer VIII well packers, are particularly advantageous for use in well bores where mechanical and/or hydraulic setting is required.

The hydraulic actuation of the packers is achieved by a combination of mechanical tension and hydraulic pressurization. Although this is acceptable in the majority of the cases, under the present conditions of extreme temperature ranges and the desirability to close in the well before setting the packer, it is necessary to utilize a packer assembly that is totally actuatable by hydraulic pressure and which is retrievable by wire line or tubing retrieval tools.

It is also desirable to utilize a packer assembly with a thermal contraction mechanism for absorbing the large cumulative contraction of the tubing string resulting from the extremely cold conditions experienced by the string in the hole when cold fluids are pumped down the string or the annulus. The only practical method of providing such a joint lies in utilizing a lengthy sliding telescoping joint, which telescoping joint may be temporarily locked into a ridged configuration while going in the well to allow manipulation of the well tools and placement within the proper location in the well as well as traversing binding conditions in the casing.

The problem lies in providing a locking mechanism in the sliding expansion joint which will withstand various shocks and abuse while going in the hole and yet which can be actuated after the well head has been flanged up. The prior art devices commonly utilized for the releasing of the telescoping expansion joint, utilize such means as a rotational threaded release, heavy shear pins, a wire line trip release, or a ball and seat combination to introduce the telescopic action into the tubing string.

The present invention solves these difficulties by providing a packer mechanism that is fully hydraulically actuatable yet which may be retrieved easily by wire line or tubing retrieval and which also features a full telescoping thermal joint having release means also total actuatable by hydraulic pressure. Thus, the mechanism of this invention may be run in on a tubing string, the well head flanged up, and then actuation of the packer and the thermal joint accomplished with a closed-in well head.

BRIEF DESCRIPTION OF THE DRAWINGS

FIGS. 1A through 1F illustrate a partial cross-sectional elevational view of the tool mechanism of this invention;

DESCRIPTION OF THE PREFERRED EMBODIMENTS

Figures 1A, 1B:
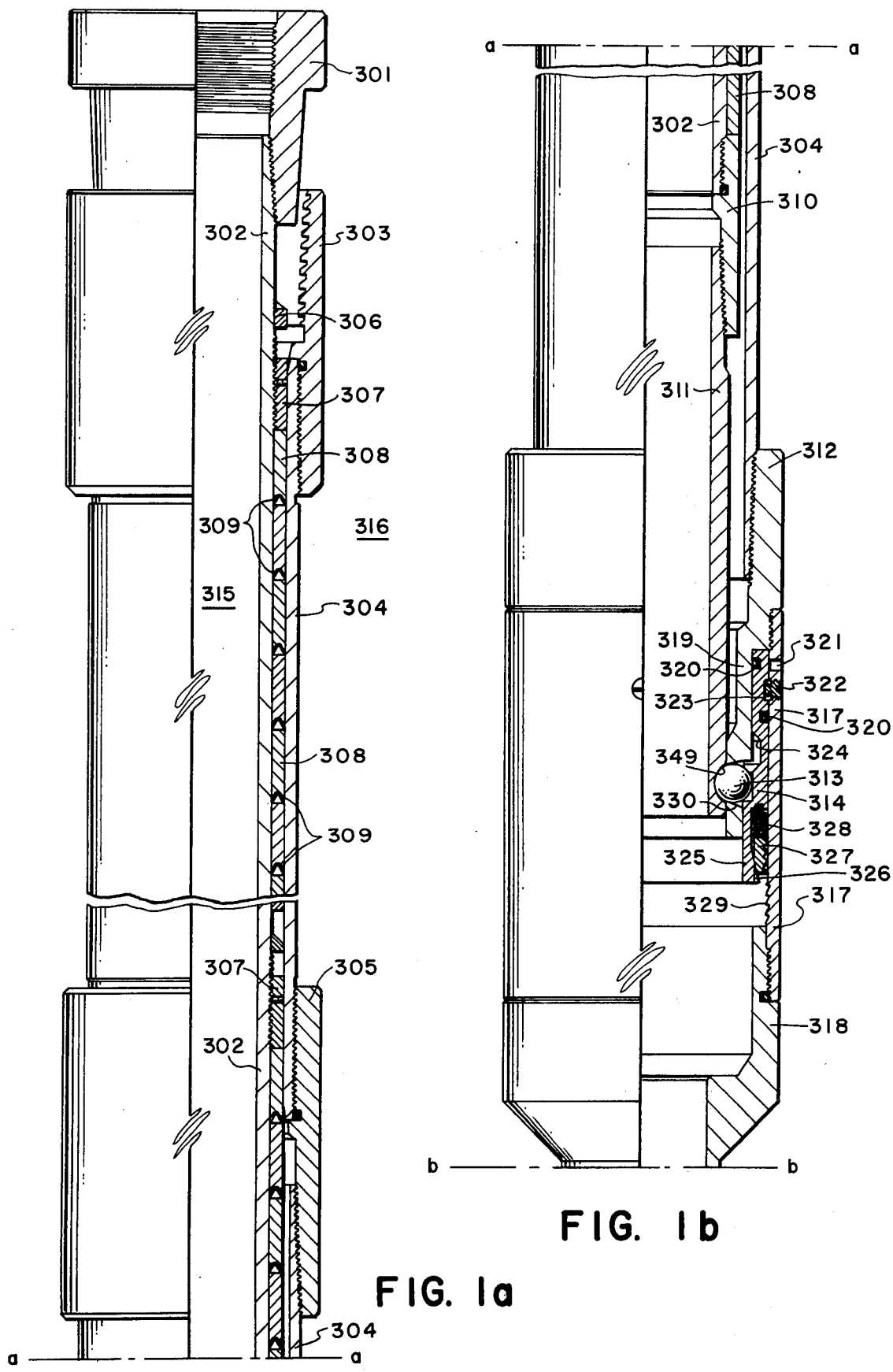
Figure 1E:
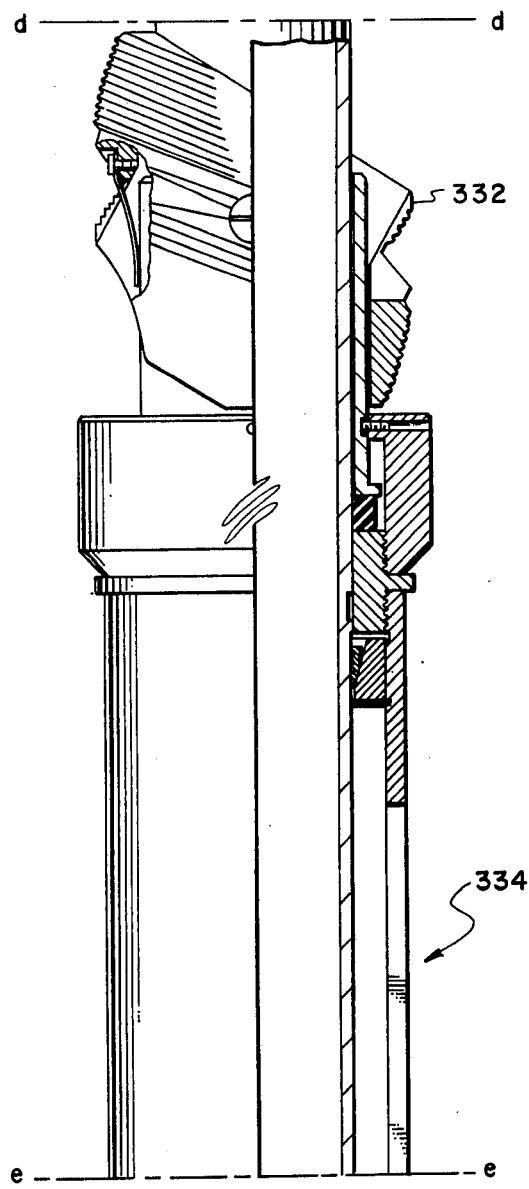
Figure 1F:
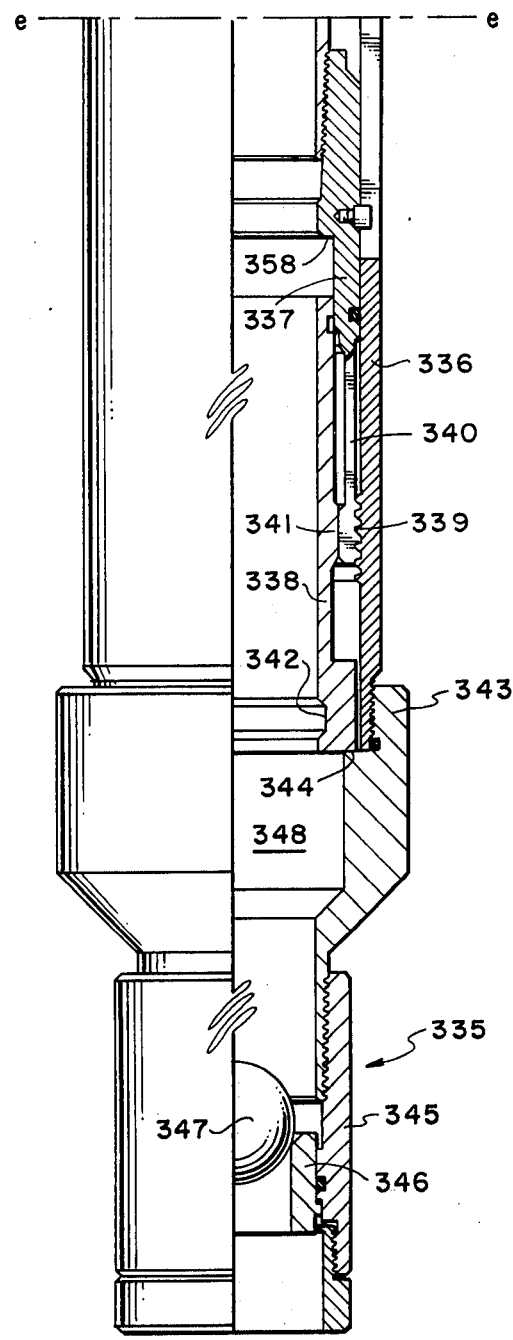

Referring now to FIGS. 1A through 1F, the preferred embodiment of the invention is disclosed in partial cross-sectional view. In FIG. 1A a tubing connection collar 301 is located at the top of the seal mandrel 302 extending downwardly therefrom. A stop ring 306 is securedly attached to mandrel 302. Mandrel 302, while shown as a single tubular extension, may also be provided in a plurality of sections joined together by threaded or other type of suitable connectors.

An external seal housing 304 is located telescopically about mandrel 302 and forms a concentric annular space therebetween containing a number of seal spacers 308 having seal rings 309 located therebetween. The external surface of mandrel 302 and the internal wall of the upper member of housing 304 preferably are polished and adapted for sliding sealable engagement with seal rings 309. Rings 309 provide telescoping action and prevent fluid flow between inner bore 315 and the annulus 316 between the tool string and the casing.

Housing 304 preferably comprises a pair of tubular members connected by a threaded collar 305. At the lower end of housing 304 is threadedly attached a locking body 312. A mandrel locking extension 311 is threadedly secured by the lower mandrel connector 310 to the bottom end of mandrel 302. Extension 311 is a short tubular section having an indented locking channel 349 formed in the outer shell wall thereof near the lower end.

A tubular piston cylinder 317 is threadedly secured on locking body 312 and has threadedly attached at its lower end a packer connector 318. Locking body 312 has a reduced diameter lower skirt section 319 located concentrically inside piston cylinder 317. A cylindrical ball release piston 314 is snugly and slidably located between skirt section 319 and cylinder 317 and is sealingly engaged therein by o-ring seals 320.

A set of ports 321 are formed through the wall of cylinder 317. One or more shear screw 322 are threadedly engaged in the wall of cylinder 317 and extend inwardly to abut in an external channel 323 formed in the outer wall of piston 314. A ball release channel 324 is formed internally in the wall of piston 314 and is arranged to receive locking balls 313 upon downward movement of piston 314.

Piston 314 has at its lower end a reduced diameter skirt section 325 which has a tapered abutting surface 326 formed near the bottom thereof. Skirt section 325, in conjunction with cylinder 317, forms an annular space therebetween containing a toothed locking member 327 biased downward by compression spring 328. A corresponding toothed section 329 is formed along the inner wall of cylinder 317 and arranged to be engaged by member 327 upon downward movement of piston 314.

Locking body 312 is provided with a plurality of tapered openings 330 containing locking balls 313, and is further adapted to prevent balls 313 from passing completely inward therethrough but allow substantial projection inward on the locking balls. Normal abutment of the central section of piston 314 against balls 313 provides a retention function maintaining the balls seated in the corresponding channel 349 of extension 311. Shear screw 322 abutting channel 323 maintains piston 314 in its retention configuration with respect to locking balls 313 thereby preventing any telescoping sliding movement between mandrel 302 and housing 304.

It should be noted that the longitudinal forces attempting to telescope housing 304 with respect to mandrel 302 are borne by the positive locking action of balls 313 and not any shearable component.

Located below and threadedly attached to packer connector 318 is a single string hydraulically actuated packer mechanism 331. The packer utilized in one preferred embodiment was Uni-Packer VII packer sold by Guiberson Division of Dresser Industries, Inc., Dallas, Texas, as disclosed at page 1525 of the 1974–75 World Oil Composite Catalog.

The packer 331 utilizes upper and lower tubular gripping members 332 and hydraulic actuation to compress elastomeric packer rubbers 333. A retrieving mechanism 334 is attached to the lower end of the packer 331 and has located therebelow hydraulic actuating valve assembly 335. The retrieving mechanism 334 comprises a slotted outer housing 336, a collet sleeve 337 and an inner abutment sleeve 338.

Housing 336 has an internal threaded section 339 utilizing a well known buttress type thread in which is securedly engaged a plurality of spring collet fingers 340 extending downard from collet sleeve 337 and having a complementary buttress thread formed externally thereon. A raised peripheral shoulder 341 is formed externally on inner sleeve 338 and is arranged for abutment with threaded section of collet fingers 340 so as to maintain the fingers engaged in buttress threads 339.

A peripheral inner channel 342 is formed inside the lower end of sleeve 338 and is arranged for engagingly receiving a retrieving tool. The actuating valve mechanism 335 comprises a connector 343 attached to the lower end of housing 336. Connector 343 has an inwardly extending shoulder 344 abutting sleeve 338 and providing the downward limit therefor. Attached to the lower end of connector 343 is a valve collar 345 containing the valve seat 346 therein. A spherical valve member 347 may be placed in the tubing and pumped down to seat on sleeve 346 thereby blocking bore 348 at the bottom.

METHOD OF OPERATION

The assembly as illustrated in FIGS. 1A through 1F is interconnected in the tubing string at the desired location with the locking mechanism disclosed in FIG. 1D securedly locked in place to prevent telescoping of the tubing string within the seal mechanism. The string is then run to the proper depth and the well head is installed and flanged up. The valve member 347 is then placed into the tubing string and pumped down to seat on sleeve 346. Pressure may then be applied to the tubing string which results in actuating the hydraulic packer thereby engaging the packer gripping members in the well casing and expanding the packer rubber elements radially outward into sealing contact with the casing.

At this time, it is desirable to initiate the telescoping temperature compensation mechanism to prevent damaging expansion or contraction of the tubing with the packer set and the well head bolted down. This is accomplished by applying pressure to the annular opening 316 between the tubing and the casing. This fluidic pressure works through ports 321 and against piston member 314 until shear screws 322 are sheared, thereby allowing piston sleeve 314 to move downward in response to the hydraulic pressure. Upon this downward movement, release channel 324 becomes located adjacent locking balls 313 allowing these balls to be wedged outward by the action of the tapered channel 349 responding to the thermal contraction of the tubing string.

The movement inward of balls 313 releases locking extension 311 and inner mandrel 302 connected to the tubing string by collar 301, thus initiating the telescoping action of the tubing string in the packer mechanism. The inner mandrel 302 is now free from the packer mechanism and is allowed to reciprocate in response to temperature variations in the tubing string while sealingly and slidably engaging seal rings 309, which in turn engage housing 304.

Figure 2:
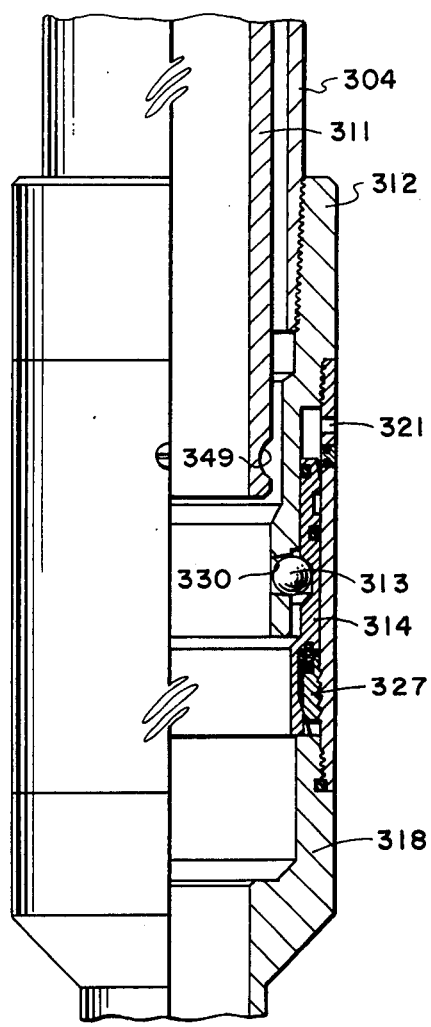
FIG. 2 is a partial cross-sectional view of a portion of 1B in a different configuration.

FIG. 2 illustrates in partial cross-sectional view the thermal contraction release mechanism as shown in FIG. 1B after releasing of the locking balls has occured in response to pressurizing of the annulus. When it is desirable to remove the tubing string from the well bore, this can be accomplished by pulling up on the string whereupon the string slides out of the packer mechanism and the housing 304 and can be removed from the well.

Removal of the packer may then be accomplished by lowering a retrieving tool, either on wire line or on tubing, to engage in the packer retrieving assembly 334 to disengage the gripping members from the well casing and relax the expanded rubber packer elements.

Figure 3:
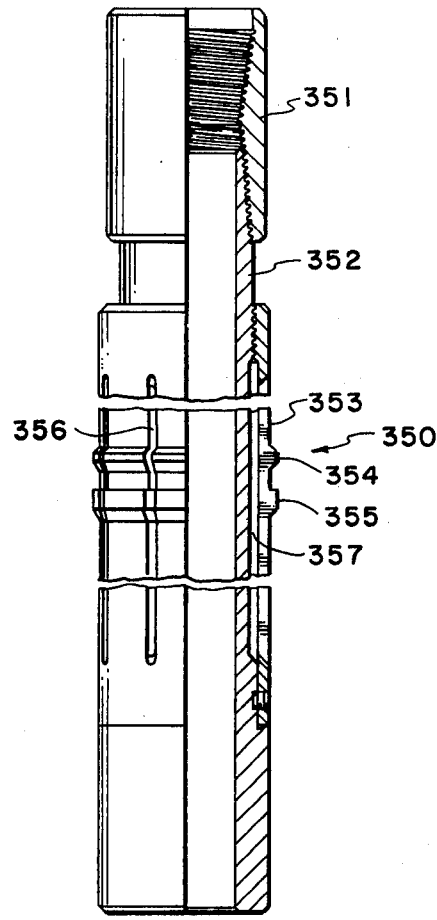
FIG. 3 is a partial cross-sectional view of a retrieving mechanism to be used with the packer assembly of FIGS. 1A through 1F.

FIG. 3 illustrates a retrieving tool for releasing the packer and removing it from the well. The retrieving tool 350 utilizes a threaded attachment collar 351 connected to a mandrel body 352 upon which is threadedly located a spring collet sleeve 353 having an upper multi-beveled external shoulder 354 and a lower beveled shoulder 355. A plurality of longitudinal slots 356 pass through the wall of collet sleeve 353 into the annular area 357 between sleeve 353 and body 352. The slots 356 allow a radial flexibility of the portion of sleeve 353 around shoulders 354 and 355.

Retrieval of the packer mechanism is performed by lowering the retrieving tool 350 down the well bore to engage in the packer wherein collet shoulder 355 passes through sleeve 338 and is flexed inward while therethrough as a result of slots 356 and flex space 357. After the retrieving tool has been lowered a sufficient distance to engage shoulder 354 in channel 342, the lower shoulder 355 will be allowed to expand outward below sleeve 338, and the upper perpendicular face of shoulder 355 will be engaged with the lower end of sleeve 338 such that the retrieving tool is locked into mechanism 334.

At this time, upward pull on retrieving tool 350 results in upward sliding movement of sleeve 338 which preferably previously had been held in place by shear means such as shear screws or a shear ring. This upward movement of sleeve 338 moves shoulder 341 out of abutment with spring collet fingers 340, and abutment of sleeve 338 with downward facing shoulder 358 of sleeve 337 then transfers the upward pulling force to this sleeve. This force results in a wedging inward of fingers 340 and disengagement from threaded section 339 so that upward movement of sleeve 337 may be accomplished, which upward movement releases the tubular gripping members 332 and allows relaxation of the radially expanded sealing elements 333.

The advantages of the above disclosed invention are numerous and include the full-bore opening passing completely through the tool to allow full production flow and further allow passing of other tools through the mechanism. Also the weight on the string and particularly the weight on the releasable thermal expansion joint is not held by any shearable means but by a positive locking mechanism. Furthermore, the packer mechanism and the releasing mechanism are adapted to operate after the well head has been flanged up.

Although a specific preferred embodiment of the present invention has been described in the detailed description above, the description is not intended to limit the invention to the particular forms or embodiments disclosed therein since they are to be recognized as illustrative rather than restrictive and it will be obvious to those skilled in the art that the invention is not so limited. For example, whereas a particular packer is shown for use with the present invention, it should be noted that this invention is suitable for use with other types of packers. All modifications and changes of this type are deemed to be embraced by the spirit and scope of the invention except as the same may be necessarily limited by the appended claims or reasonable equivalents thereof.

The embodiments of the invention in which an exclusive property or privilege is claimed are defined as follows:

1. A hydraulically actuated releasable connection comprising:
   - an inner member having locking recess means formed therein;
   - an outer housing telescoped over said inner member, forming an annular space therebetween, and having ports through the wall thereof;
   - an intermediate retainer sleeve in said annular space, having openings adjacent said recess means, and being attached to said housing;
   - locking means in said openings releasably engageable in said recess means;
   - piston means in said annular space, slidingly and sealably engaged between said retainer sleeve and said housing, and having abutment means for abutting said locking means into engagement in said recess means;
   - said piston means being in communication with said port means and further having release channel means formed therein adjacent said abutment means and arranged to receive said locking means therein; and,
   - latch means attached to said piston means and adapted to be latched to said housing after hydraulic actuation of said piston through said ports.

2. The releasable connection of claim 1 further comprising shearable retention means shearably attaching said piston means to said housing in a position to maintain said abutment means in abutment with said locking means.

3. A thermal contraction joint for use in connecting tubular conduit and arranged for hydraulic release, said joint comprising:
   - elongated tubular mandrel means adapted for connection to a first tubular conduit;
   - elongated tubular housing means adapted to be connected to a second conduit and telescopically engaging said mandrel means;
   - slidable seal means located sealingly between said mandrel means and said housing means; and,
   - hydraulically releasable connection means attaching said mandrel means to said housing means and adapted to withstand substantial longitudinal forces therebetween, and further comprising:
     - a retention recess formed in said mandrel means;
     - locking means on said mandrel means and engageable in said recess;
     - abutment means located in said housing means and arranged for movement from a position abutting said locking means to a non-abutting position therewith;
     - latch means in said connection means arranged to latch said abutment means to said housing means in said non-abutting position thereof; and,
     - hydraulic piston means in said housing adapted to receive hydraulic pressure and move with said abutment means into said non-abutting position.

4. The thermal contraction joint of claim 3 further comprising shear means shearably holding said abutment means in said abutting position.

5. The thermal contraction joint of claim 3 wherein said locking means comprises one or more radially movable locking members and said abutment means comprises a slidable sleeve having an abutment area and an adjacent releasing channel formed therein; with said piston means comprising a pressure responsive area on said slidable sleeve.

* * * * *